United States Patent [19]

Skerker et al.

[11] Patent Number: 4,937,942
[45] Date of Patent: Jul. 3, 1990

[54] KITCHEN TOOL

[75] Inventors: Robert Skerker, Buffalo, N.Y.; William Prindle, Santa Barbara, Calif.

[73] Assignee: Robinson Knife Manufacturing Co., Inc., Springville, N.Y.

[21] Appl. No.: 286,325

[22] Filed: Dec. 19, 1988

[51] Int. Cl.⁵ .............................................. A47J 43/28
[52] U.S. Cl. ...................................... 30/345; 30/136; 30/169; 30/324; 294/7
[58] Field of Search .......... 30/136, 123, 137, 147–150, 30/324, 345, 169; 294/7, 8, 6, 2

[56] References Cited

U.S. PATENT DOCUMENTS

| | | | |
|---|---|---|---|
| 3,877,143 | 4/1975 | Montesi | 294/7 X |
| 4,423,551 | 1/1984 | Chmela et al. | 294/7 X |
| 4,711,029 | 12/1987 | Somerset | 294/7 X |
| 4,772,653 | 9/1988 | McKenna | 525/150 X |

Primary Examiner—Frank T. Yost
Assistant Examiner—Rinaldi Rada
Attorney, Agent, or Firm—Hedman, Gibson, Costigan & Hoare

[57] ABSTRACT

A kitchen tool integrally formed in one piece made of a polyetherimide, having a capacity for withstanding high temperatures and facilitating microwave use.

1 Claim, 2 Drawing Sheets

KITCHEN TOOL

FIELD OF THE INVENTION

This invention relates to kitchen tools and, more particularly, to plastic kitchen tools having a capacity for withstanding high temperatures and facilitating use in the microwave environment. Most specifically, the invention relates to kitchen tools that are integrally formed in one piece.

BACKGROUND OF THE INVENTION

Kitchen tools relate generally to turners, spatulas, spoons, cake cutters, forks, ladles and those other utensils that are used in the kitchen for the various functions dealing with the handling of food.

In the early days, kitchen tools, were typically, formed with wooden handles and metal work ends, the work ends being the surface of a turner used to turn a hamburger or an egg; the bowl section of the spoon; the prongs of a fork, etc. In addition, the kitchen tools required a shank section to connect the handle to the work end. Later, with the advent of plastics, plastic handles became common for kitchen tools and soon nylon, other plastics and teflon coated products were used to form the work end section. Still, the handles were formed of different material from the work ends and metal shanks were and are still used to connect the handle and work end. After repeated use, the shanks can become loose thus causing the work end to dislodge from the shank, often during use.

As in the past, the current kitchen tool must also necessarily be able to withstand high temperatures and, of course, must be attractive. It is important that the handle not conduct heat so that the kitchen tool can be touched during use.

In addition, the materials used must be compatible with food. This generally means that the material of the kitchen tool and, in particular, the work end must be sufficiently stable to avoid migration of any of the material from the work end to the food being handled by the kitchen tool and must be approved for use with food by the United States Food and Drug Administration.

Due to the fact that the elements that comprise the kitchen tools are made from different materials, the configuration of kitchen tools often have sharp corners. These sharp corners make cleaning of the kitchen tool difficult. After repeated use, food can become trapped in the corners.

In addition, continued use of the kitchen tools often results in discoloration of the tools from repeated contact with food dyes, acids and cleaners.

It has recently become necessary to provide kitchen tools with the capability to operate in the microwave environment. Microwave ovens have become common kitchen appliances and it is apparent that the use of microwave ovens will increase.

Recently, polyetherimides have been developed. Polyetherimide is available commercially under the trademark ULTEM ®, a trademark of the General Electric Company. ULTEM ® has been found to have application in electrical and electronics service, automotive, aerospace, and other areas wherein ductility for snap fit capability and elevated temperature warp resistance, high electrical insulation, and flame resistant properties are desirable. It is believed that polyetherimides also have application as pin connectors, flame resistant plenum connectors, high temperature bobbins, coils, fuse box, and wire coatings.

However, surprisingly it has been discovered that polyetherimides and, in particular, polyetherimide bearing the grade designation ULTEM ®-1,000 and ULTEM ®-1,010 are virtually unaffected by microwave radiation.

BRIEF DESCRIPTION OF THE INVENTION

As a result of the requirements of kitchen tools, it is customary to form kitchen tools of the materials that necessarily provide the characteristics required for each element of the kitchen tool, namely the work end, shank or handle. Basically, the work end is formed of a material that is stable under high temperature conditions; i.e., metal. The handle is formed of inexpensive material that does not conduct heat and which can be formed into a comfortable gripping configuration. The shank that connects the handle and work end is typically formed of a material that is structurally sound and on which the handle and work end can be mounted; i.e., steel.

It is an object of the present invention to provide kitchen tools that have each of the required performance characteristics for the respective parts provided by a single material.

It is a further object of the present invention to provide kitchen tools integrally formed in a single piece consisting of the handle, work end and shank.

It is a further object of the present invention to provide kitchen tools that will be unaffected by high temperatures.

It is a further object of the present invention to provide kitchen tools that will maintain their shape.

Still a further object of the present invention is to provide kitchen tools that are durable.

A further object of the present invention is to provide kitchen tools that will not discolor after repeated contacts with food.

Still a further object of the present invention is to provide kitchen tools with smooth corners.

Accordingly, the present invention is directed to kitchen tools formed entirely of polyetherimide. Specifically, the preferred embodiment of the kitchen tools comprises single piece kitchen tools integrally formed of polyetherimide.

BRIEF DESCRIPTION OF THE DRAWINGS

The invention will be better understood by way of example with reference to the accompanying drawings in which.

DESCRIPTION OF THE PREFERRED EMOBIDMENT

The kitchen tools of the present invention cover the full spectrum of kitchen tools. Kitchen tools include turners, cake cutters, spatulas, forks, spoons, ladles, egg lifters and every other item used in the kitchen to handle food.

Figure 1:
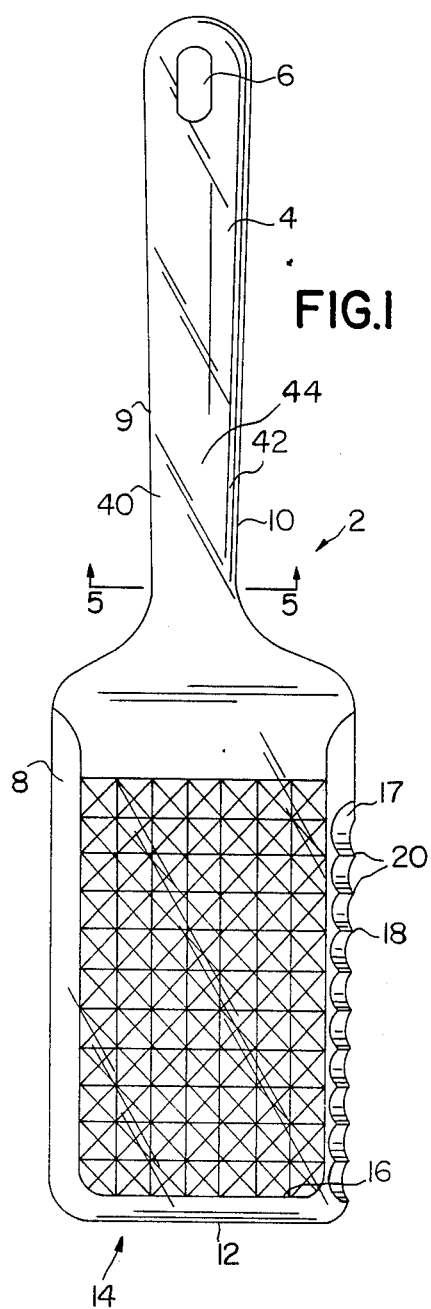
FIG. 1 is a plan view of a turner formed in accordance with the present invention.

The turner 2 of FIG. 1 is a single piece kitchen tool formed by conventional injection molding. The turner 2 is comprised of a handle 4 having a hole 6 for hanging, a work end 8 and a connection section 10. The handle 4, work end 8 and connection section 10 are one continuous integral piece formed of the same material. The underside 9 of the connection section 10 is substantially U-shaped. Each opposed edge 40 and 42 of the connection section 10 has a thickness of about 250 mils and tapers to a thickness at the center section 44 of the connection section 10 of about 160 mils.

The work end 8 is provided with a tapered edge 12 at the front end 14 adapted to facilitate gaining access to the bottom of the food being worked by the work end 8. For example, the tapered edge 12 facilitates reaching under the egg or hamburger to be turned. A third side 18 of the work end 8 is a blade type edge provided with serations 20. Again, the serations 20 are tapered. The serations 20 can be used to cut food into separate pieces without using a knife. In addition, the serations 20 can be used for decorating purposes when the third side 18 having the serations 20 is passed across icing on the top of a cake.

Figure 3:
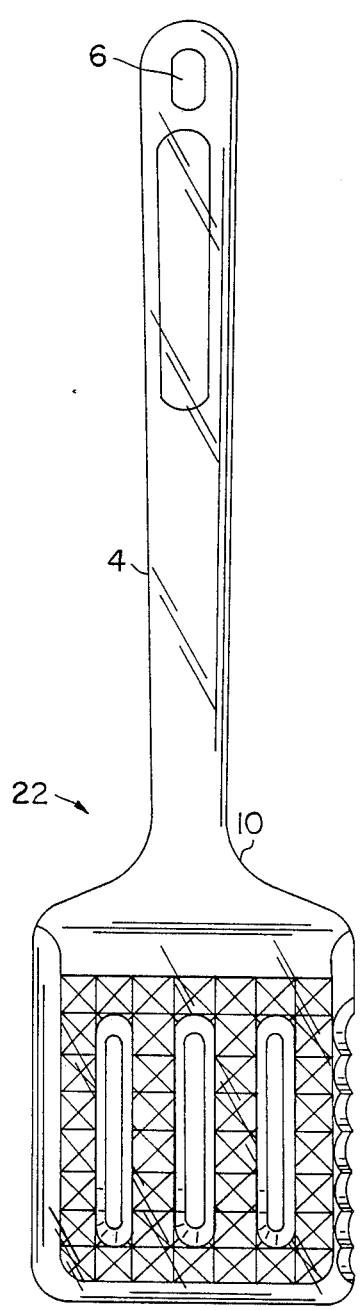
FIG. 3 is a plan view of a spatula formed in accordance with the present invention.
Figure 4:
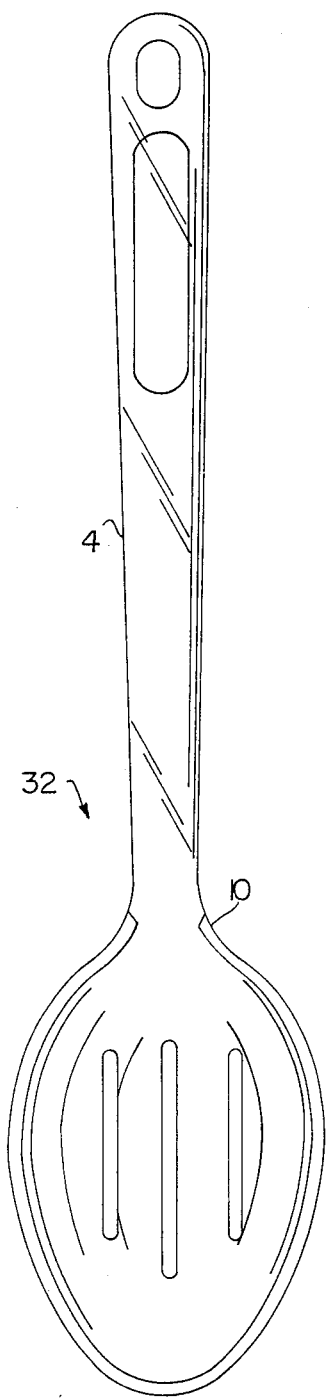
FIG. 4 is a plan view of a spoon formed in accordance with the present invention.

The spatula 22, shown in FIG. 3 of the present invention, and the spoon 32, shown in FIG. 4 of the present invention are all integrally formed in one piece as the turner 2 of FIG. 1. The handle, work end and connecting section of each kitchen tool shown in FIGS. 1, 3 and 4 are formed of the same material and in a single piece. No separate connecting parts are required.

Figure 2:
FIG. 2 is a side view of the turner of FIG. 1 showing the edge configuration.
Figure 5:
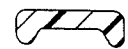

The edge 12 of the turner 2, as seen in FIGS. 1 and 2, is arranged to taper from the average work end thickness of 125 mils at line 16 down to an edge thickness of 0.03125 mils at the front end 14. Similarly, the third side 18 with serations 20 tapers from a location 17 opposite the front edge 12 to a plurality of points forming the serations 20. It has been found that these dimensions enhance working the food for which the work end is intended and achieve a stability not previously realized with materials other than metal. This stability has been experienced in that the phenomenon of roll over previously associated with non-metal work ends is minimized. Roll over is a condition wherein the edge of the work end, after being subjected to heat, begins to approach a fluid rather than solid state and, in effect, begins to show signs of melting. The work end, when allowed to cool, then re-forms to a shape different than the shape originally obtained and thus, effects a blunt rather than sharp edge.

A fork (not shown) formed in accordance with the present invention is comprised of a handle, connection section and work end. The workpiece is further comprised of a plurality of tines, wherein each tine is provided with serations to facilitate the handling of foods.

The preferred method of manufacture of the kitchen tool is conventional injection molding. The preferred material used to form the kitchen tool is a polyetherimide identified at present by the trademark ULTEM®-1010. Practice has also taught that ULTEM®-1000 is another acceptable polyetherimide for use in forming the workpieces of the present invention.

Practice has shown that the kitchen tools of the present invention are virtually unaffected by microwave radiation. Tools 2, 22 and 32 have been placed in a microwave environment generating 1000 watts. Upon removal, visual examination and testing for malleability and measurement of deformation show no change in malleability and zero change in the dimensions.

Practice has shown that use of ULTEM®-1010 in constructing the kitchen tools of the present invention will provide the maximum benefits of this invention. The calculated length of a kitchen tool of between about 11 or 12 inches is preferred. A handle of about 7.25 inches in length and about 0.75 inches wide is best for ease at use. A work end of about 4.75 inches long is designed in order to work with food.

Further, it has been found that the necessary structural characteristics for kitchen tools made of ULTEM®-1010 is achieved when the thickness of the work end is about 125 mil and the thickness of the connection section is substantially about 250 mil at the edges and 160 mil at the center to provide durability and strength.

We claim:

1. A single piece kitchen tool comprising a handle, a work end, and a connection section connecting the handle and work end, wherein said connection section is comprised of two opposed edges, and a center section which forms a substantially U-shaped cross-section and wherein said handle, work end and connection section are one continuous integral piece consisting of polyetherimide.

* * * * *